United States Patent
Jibbe et al.

(10) Patent No.: US 7,958,397 B2
(45) Date of Patent: Jun. 7, 2011

(54) SYSTEM FOR AUTOMATICALLY CONFIGURING A STORAGE ARRAY

(75) Inventors: Mahmoud K. Jibbe, Wichita, KS (US); Britto Rossario, Bangalore (IN); Pavan P S, Bangalore (IN)

(73) Assignee: LSI Corporation, Milpitas, CA (US)

( * ) Notice: Subject to any disclaimer, the term of this patent is extended or adjusted under 35 U.S.C. 154(b) by 324 days.

(21) Appl. No.: 12/143,123

(22) Filed: Jun. 20, 2008

(65) Prior Publication Data

US 2009/0319747 A1    Dec. 24, 2009

(51) Int. Cl.
*G06F 11/00*    (2006.01)
(52) U.S. Cl. ........................................................ 714/33
(58) Field of Classification Search ................. 714/33
See application file for complete search history.

(56) References Cited

U.S. PATENT DOCUMENTS

| | | | |
|---|---|---|---|
| 7,107,190 B1* | 9/2006 | Tsuchiya et al. .................. 703/1 |
| 7,127,633 B1* | 10/2006 | Olson et al. ....................... 714/4 |
| 7,720,884 B1* | 5/2010 | Gandhi et al. ................. 707/804 |
| 2004/0019822 A1* | 1/2004 | Knapp, III ......................... 714/6 |
| 2004/0093361 A1* | 5/2004 | Therrien et al. ............... 707/204 |
| 2004/0193388 A1* | 9/2004 | Outhred et al. .................... 703/1 |
| 2004/0205179 A1* | 10/2004 | Hunt et al. ...................... 709/223 |
| 2005/0108474 A1* | 5/2005 | Zhang et al. ................... 711/114 |
| 2005/0198631 A1* | 9/2005 | Bisher et al. ................... 717/178 |
| 2007/0028230 A1* | 2/2007 | Goetz et al. .................... 717/174 |
| 2007/0204105 A1* | 8/2007 | Lauffer et al. ................. 711/114 |
| 2008/0108405 A1* | 5/2008 | Brosnan et al. .................. 463/16 |
| 2008/0133856 A1* | 6/2008 | Ontko ............................ 711/162 |

* cited by examiner

*Primary Examiner* — Bryce P Bonzo
(74) *Attorney, Agent, or Firm* — Christopher P. Maiorana, PC

(57) ABSTRACT

A method for configuring a storage array, comprising the steps of (A) checking a syntax of an input file, (B) generating an error if a particular syntax is not met, (C) determining whether a physical hardware configuration matches a desired set of design parameters, (D) generating a script file containing a plurality of symbol commands, (E) sending the script file containing the symbol commands to the storage array and (F) verifying whether the physical hardware configuration is valid.

18 Claims, 5 Drawing Sheets

SYSTEM FOR AUTOMATICALLY CONFIGURING A STORAGE ARRAY

FIELD OF THE INVENTION

The present invention relates to storage arrays generally and, more particularly, to a method and/or apparatus for implementing host software to automate a large configuration to provide cycle time reduction.

BACKGROUND OF THE INVENTION

Conventional storage arrays implement a variety of stress tests. Large configurations create complexity issues that make testing more difficult. Factors that make testing more difficult include systems that have (i) a minimum two hosts or heterogeneous hosts, (ii) at least two storage arrays, (iii) a number of volumes and cross mappings across a number of hosts, (iv) a number of premium features enabled on each volume, and (v) a number of volume parameters such as (a) media scan settings, (b) a cache mode—write back/write through, (c) segment size, and (d) volume ownership.

Conventional testing implementations configure a setup to manually write a CLI (Command Line Interface) script file inline with the testing requirements. The script is executed with a script engine in an Enterprise Management Window. Time invested in understanding the requirements and writing a script is often substantial. A script for stress configuration often has more than 2000 lines of commands (considering arrays with 2048 volumes). This procedure is followed for each storage array and changes are made based on the complexity of each array. Any typographical error in the script can prove to be costly and can involve additional time to resolve the problem and run the script again.

Testing scripts can fail for one or more of the following reasons (i) typographical errors, (ii) duplication of volume numbering, (iii) volume number sequencing, and (iv) syntax issues. Even if none of the above errors occur, the objective of generating a setup configuration may not be met due to issues such as (i) creating more than required volumes per volume group, (ii) mapping volumes to a wrong host, (iii) capacity requirements not met with respect to the physical configuration, and (iv) incorrect drive selection.

Writing an initial CLI script for a particular configuration often involves many iterations of validation, execution and rectifying mistakes. Any issue encountered during the setup configuration involves lead time and causes time lost due to any of the errors listed. Such lead time can prove to be very costly in a large configuration setup. If the same procedure is extended for multiple configurations, the process can be time consuming.

The disadvantages of such conventional approaches involve the increase in the cycle time of the configuration. The CLI script generation is manual and therefore not foolproof. Such a manual process often leads to typographical errors. Time is lost correcting errors. A harness computer is needed to run the script, which depends on specific host software on the harness computer. Validation of requirements versus physical configuration also has to be done manually. Incorrect drive selection may lead to insufficient capacity while implementing the configuration.

It would be desirable to implement a system for testing a storage array that reduces errors associated with manual test implementations.

SUMMARY OF THE INVENTION

The present invention concerns a method for configuring a storage array, comprising the steps of (A) checking a syntax of an input file, (B) generating an error if a particular syntax is not met, (C) determining whether a physical hardware configuration matches a desired set of design parameters, (D) generating a script file containing a plurality of symbol commands, (E) sending the script file containing the symbol commands to the storage array and (F) verifying whether the physical hardware configuration is valid.

The objects, features and advantages of the present invention include providing a storage testing system that may (i) be implemented independently of a host computer, (ii) provide an automated process to reduce errors and/or (iii) eliminate unnecessary generation of already existing array configuration scripts by maintaining a repository of array configuration files.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a method that may eliminate manual errors and/or achieve cycle time reduction in the configuration of a storage array. A script file may be automatically generated by a program and may be used and/or reused across a number of configurations. In one example, the present invention may customize the configuration of a storage array using a set of symbol commands (e.g., via a file Symbols.jar) which makes the execution platform and host independent of a particular software platform. A setup script may be configured from anywhere in the same network. Such a setup may be implemented to eliminate one or more of the following (i) the need for a separate harness computer, (ii) the need to install dedicated host software, (iii) the overhead of adding an array in an Enterprise Management Window (EMW), (iv) the time needed to manually write a script based on particular design criteria, and/or (iv) manual errors that may occur while writing scripts. Each of such problems may be costly and/or time consuming.

Figure 1:
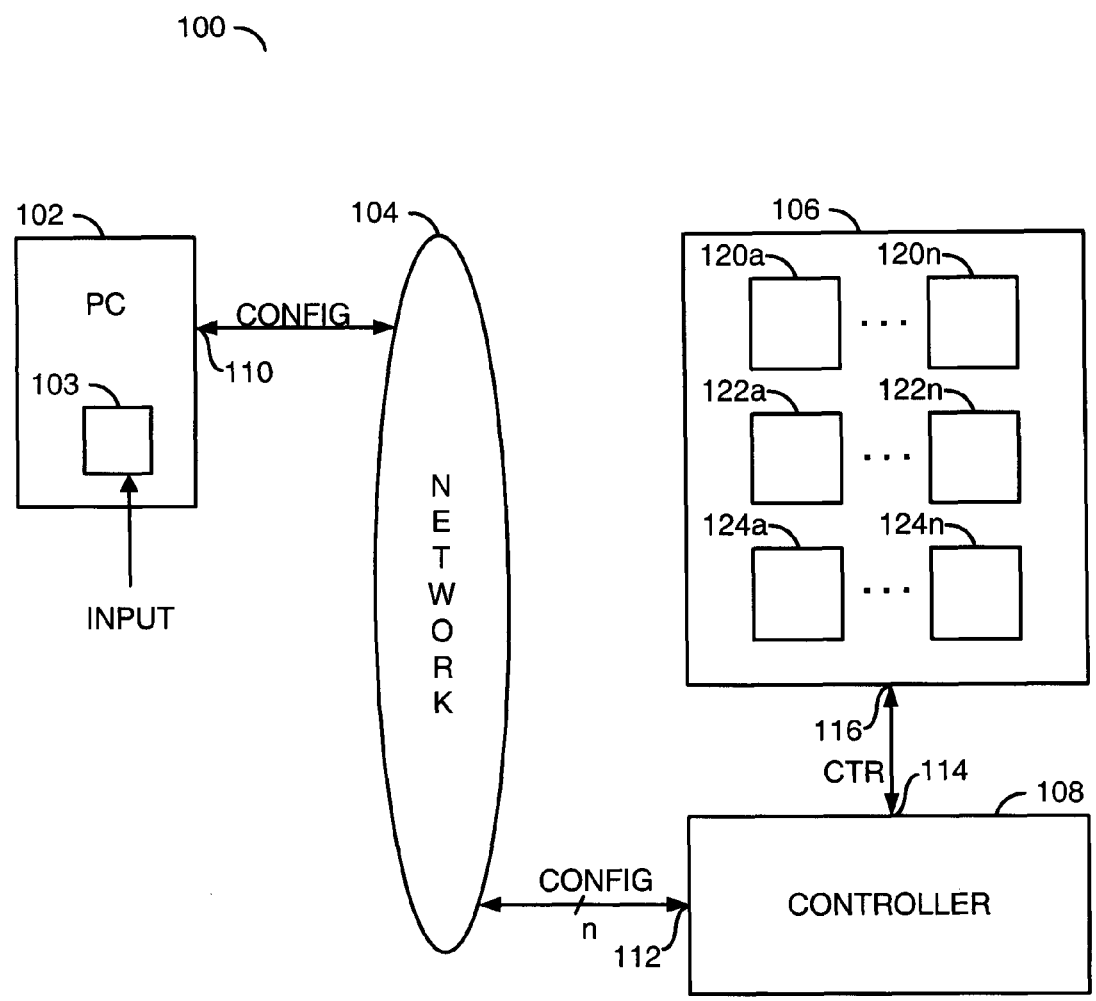
FIG. 1 is a block diagram illustrating an embodiment of the present invention.

Referring to FIG. 1, a block diagram of a system 100 is shown illustrating a context of the present invention. The system 100 generally comprises a block (or circuit) 102, a network 104, a block (or circuit) 106, and a block (or circuit) 108. The circuit 102 may be implemented as a computer. The circuit 102 may include a program 103. The circuit 106 may be implemented as a number of storage devices (e.g., a drive array). The circuit 108 may be implemented as a controller. In one example, the circuit 108 may be a Redundant Array of Independent Disks (RAID) controller. The computer 102 may have an input/output 110 that may present a configuration file (e.g., CONFIG). The file CONFIG may be sent through the network 104 to an input/output 112 of the controller 108. The controller 108 may have an input/output 114 that may present a signal (e.g., CTR) to an input/output 116 of the storage array 106. The storage array 106 may have a number of storage devices (e.g., drives or volumes) 120a-120n, a number of storage devices (e.g., drives or volumes) 122a-122n and a number of storage devices (e.g., drives or volumes) 124a-124n. In one example, each of the storage devices 120a-120, 122a-122n, and 124a-124n may be implemented as a single drive, multiple drives, and/or one or more drive enclosures. In another example, each of the storage devices 120a-120, 122a-122n, and 124a-124n may be implemented as one or more non-volatile memory devices and non-volatile memory based storage devices (e.g., flash memory, flash-based solid state devices, etc.).

The design criteria for a particular setup configuration of the drive array 106 normally determines the inputs to the program 103. The file CONFIG may be the desired configuration without any errors. The program 103 may start by receiving a file (e.g., INPUT). The file INPUT generally comprises volume configuration information for the drive array 106 and the controller 108. Such volume configuration information may include (i) volume and volume group count, (ii) RAID levels, (iii) drive lists, (iv) mapping information, (v) naming conventions, (vi) remote volume mirroring (RVM) pair information, (vii) premium features and high level volume, (viii) storage array Internet Protocol (IP) addresses, and/or (ix) volume, volume group and storage array attributes etc.

An example of the file INPUT may be defined as:

```
--------------------------- input.rtf ---------------------------
# Please enter the input in the next line for each of the prompts
# Enter the script name to be created for volume creation
Vol_create_Array1.script
# Enter the Total Number of Volume Groups to be created
8
# Enter the Total Number of Standard Volumes to be created
2048
# Enter the Total Number of Standard Volumes per VG to be created of high
capacity
32
# Enter the GHS drive(s) details in tray, slot order separated by " "(space)
1,12 2,12 3,12
# RAID 1:
# Raid 1 VG "1"
# Enter the Drive details in tray,slot order separated by " "(space)
0,1 1,1
# Enter the Capacity of Volumes to be created in "<number> GB" or "<number> MB"
format
2 GB
# MAPPING
# Enter the script name to be created for host mapping of volumes
Vol_mapping_Array1.script
# Enter the Number of mappings
192
# Enter the Host1 name [For Array2 reverse the order of hostnames mentioned]
Win_32
# Enter the Host2 name [For Array2 reverse the order of hostnames mentioned]
Win_64
# Enter the LUN start number [Please enter the input, taking care of Array2
mapping]
0
# Enter the script name to be created for RVM, Snapshot and Volume Copy creation
Snap_RVM_VCP_Array1.script
# SNAPSHOTS
# Enter the Number of Snapshots to be created [If not required, enter 0]
128
# Enter the Number of Snapshots/Base to be created
2
# RVM
# Enter the Number of Mirror (RVM) relationships to be established [If not
required, enter 0]
8
# Enter the Secondary Array name
XBB2-3334
# VCP
# Enter the Number of Volume Copies to be created [If not required, enter 0]
16
--------------------------------------------------------------------------------
```

Other formats for the file INPUT may also be implemented. The program 103 may be written with a programming language (e.g., C++ or other programming language). The program 103 may be used to (i) accept the file INPUT, (ii) verify the syntax and (iii) store the information by parsing through the file INPUT. For ease of use, a skeletal file INPUT may also be generated with a spreadsheet Macro (e.g., an Excel spreadsheet macro) with specifications fed manually and later adjusted with one or more particular desired customization parameters.

In one example, the program 103 may sequence the input parameters and start processing in the following sequence (i) syntax check for the input file and throws an error if not met, (ii) physical hardware configuration versus requirements match analysis, (iii) generate the script with symbol commands, (iv) send one or more symbol commands via a file (e.g., Symbols.jar) to the storage array, (v) verify the configuration for correctness of volume configuration, mapping and attributes and/or (vi) save the configuration with name. One or more of such processing steps may be implemented.

Figure 2:
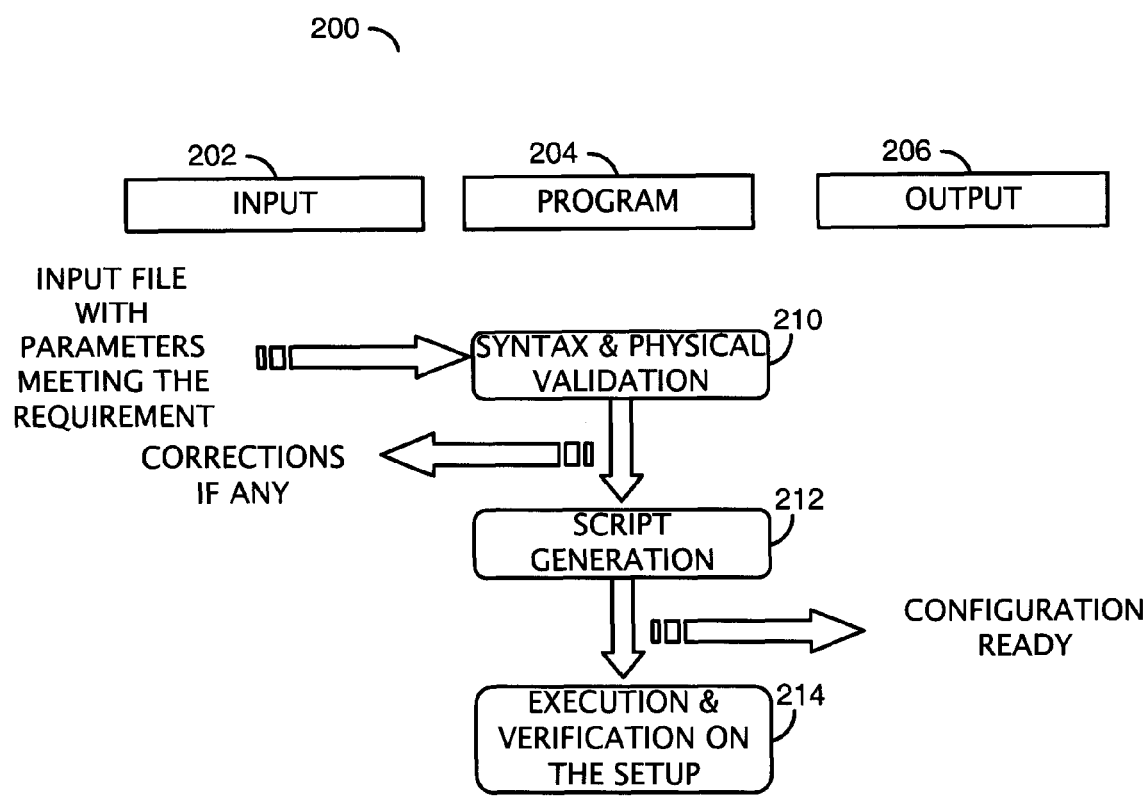
FIG. 2 is a flow diagram illustrating a high level flow.

Referring to FIG. 2, a diagram of a high level process 200 of the present invention is shown. The process 200 generally comprises an input portion 202, a program portion 204 and an output portion 206. The input portion 202 may present the file INPUT with a number of parameters meeting the desired requirements. The program portion 204 (which generally corresponds to the program 103 of FIG. 1) generally comprises a step (or state) 210, a step (or state) 212 and a step (or state) 214. The step 210 may receive the file INPUT and provide a syntax of physical validation. The step 210 may also provide a file (e.g., corrections) back to the input section 202 requesting any needed corrections. The step 212 may generate a script. The step 212 may also present a script file (e.g., the file CONFIG of FIG. 1) to the output section 206. The state 214 may execute and verify the script file.

Figure 3:
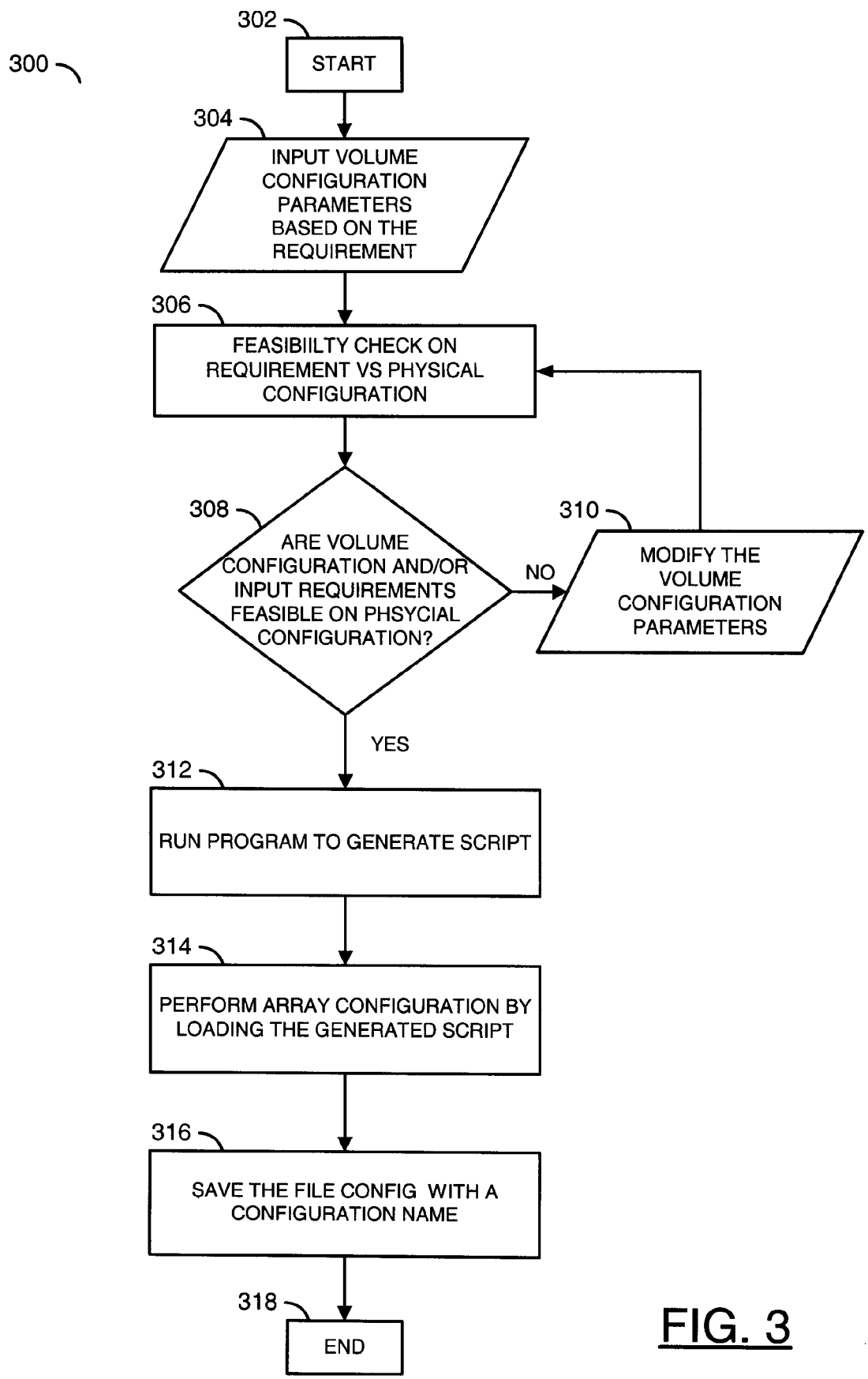
FIG. 3 is a flow diagram illustrating a program execution.

Referring to FIG. 3, a method (or process) 300 is shown. The process 300 generally comprises a step (or state) 302, a step (or state) 304, a step (or state) 306, a decision step (or state) 308, a step (or state) 310, a step (or state) 312, a step (or state) 314, a step (or state) 316, and a step (or state) 318. The state 302 may start the process 300. The state 304 may receive the file INPUT containing volume configuration parameters based on the desired design criteria. The state 306 may check the feasibility of the requirement versus the physical configuration available. The state 308 may determine if the volume configuration and/or input requirements are feasible with the physical configuration available. If not, the process 300 moves to the state 310. The state 310 modifies the volume configuration parameters, then moves the process 300 back to the state 306. If the state 308 determines that the volume configuration requirements and/or input requirements are feasible with the physical configuration, then the process 300 moves to the state 312. The state 312 runs the program 103 to generate the script file CONFIG. Next, the state 314 performs an array configuration by loading the generated script. Next, the state 316 saves the file CONFIG with a particular configuration name. The state 318 ends the process 300.

SYMBOL APIs are gathered and placed in an appropriate order for its execution by making use of SYMBOL.jar and SYMBOLutil.jar files. On execution of the APIs for a particular IP address, a new storage array configuration for that array is configured for the user/administrator. The created configuration may be saved for future use in the scenario where the same configuration is needed (e.g., after any configuration wipe).

A sample using the above mentioned APIS may be defined as:

Symbol commands may be sent to the storage array 106 and the controller 108 via a Symbols.jar file (e.g., the file CONFIG) in java compatible format. Using a java file makes the usage platform and Operating System (OS) independent. Such flexibility allows the configuration program 103 to run from anywhere on the network 104. Such hardware independence provides mobility in the configuration of the drive array 106. Cycle time may be saved when the validation and/or verification is done programmatically. Such a mechanism may provide a foolproof implementation, avoiding manual errors.

The present invention may be used to configure multiple drive array and/or storage array setups if each setup matches the previous requirements. For example, when the storage devices 120a-120n are implemented as non-volatile memory based storage devices other than traditional disk drives, the storage devices 120a-120n may use a setup similar to the storage devices 122a-122n and/or the storage devices 124a-124n. Since the file CONFIG is typically saved, the program 103 may be used to scan an existing configuration, analyze any differences and modify the script accordingly to cater to the new requirements.

Two scenarios may be addressed with the program 103, minimizing the time invested by the administrator to manually analyze the difference in configuration, write a script or generate a script and get the configuration ready.

A first scenario (e.g., scenario 1) may occur when the file CONFIG has an existing volume configuration. The program 103 may analyze the setup and decide whether to generate a new script or use the existing storage array configuration.

Figure 4:
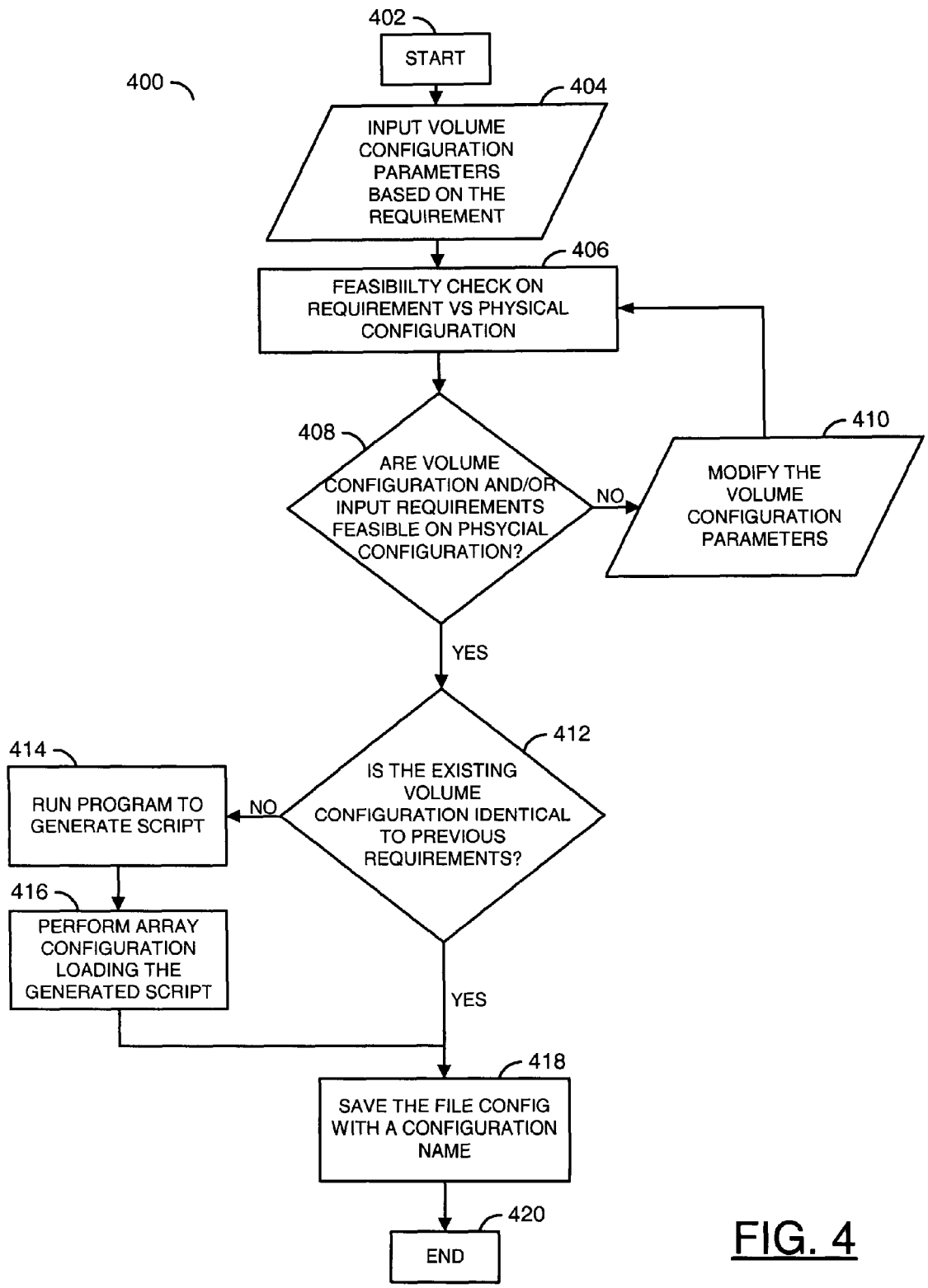
FIG. 4 is a flow diagram illustrating a first scenario of the program execution.

Referring to FIG. 4, an example of a method (or process) 400 illustrating such the scenario 1 is shown. The process 400 generally comprises a step (or state) 402, a step (or state) 404, a step (or state) 406, a decision step (or state) 408, a step (or state) 410, a decision step (or state) 412, a step (or state) 414, a step (or state) 416, a step (or state) 418 and a step (or state) 420. The state 402 may be start the process 400. The state 404 may input the volume configuration parameters based on the particular requirements of the configuration. The state 406 may check the feasibility of the requirements versus the physical configuration. The state 408 determines if the volume configuration and/or input requirements meet the feasibility available on the physical configuration. If not, the pro-

---

```
SYMbols=SYMemerald.jar
SPM=${SPM:=$host1}
SPM2=${SPM2:=$host2}
    # Read drive information from array
java -classpath .:$SYMbols SYMbolUtils.SLookUtil -I $IP -d | grep "Optimal" |
grep "Drive" |
awk '{pr
int $2}'
    # Create Volume group
java -classpath .:$SYMbols SYMbolUtils.SArrayUtil -I $IP -cv
CAPACITY=$capacity$unit:DRIVES=$drivespec:RAIDLEVEL=$raid:LABEL=$label$dash$cont
    # Create Volume
java -classpath .:$SYMbols SYMbolUtils.SVolumeGroupUtil -I $IP -G $((loop
+offset)) -cv
LABEL=$label$dash$cont:CAPACITY=$capacity$unit
    # Volume Mapping
java -classpath .:$SYMbol SYMbolUtils.SPUtil -I $IP -m VOLUME=$label-$mcont$SPM
java -classpath .:$SYMbol SYMbolUtils.SPUtil -I $IP -m VOLUME=$label2-$mcont$SPM2
    # Snapshot Creation
java -classpath .:$SYMbol SYMbolUtils.SVolumeGroupUtil -I $network$IP -G $VOLGRP
-cs
BASELABEL=$BASELABEL:CAPACITY=$CAPACITY:SNAPLABEL=SNAP-$
BASELABEL:WARNTHRESHOLD=$WARNTHRESHOLD
``` cess 400 moves to the state 410. The state 410 modifies the volume configuration parameters and returns to the state 406. If the decision state 408 determines that the volume configuration and/or input requirements meet the feasibility available on the physical configuration, the process 400 moves to the state 412. The state 412 determines if the existing volume configuration is identical to a previous requirements file. If so, the process 400 moves to state 418. The state 418 saves the file CONFIG to a repository of configuration files and moves to the state 420. If the decision state 412 determines that the existing volume configuration is not identical to a previous requirements/input file, the process 400 moves to the state 414. The state 414 runs the program to generate a script. Next, the process 400 moves to the state 416 which performs an array configuration by loading the generated script.

A second scenario (e.g., scenario 2) may occur when a configuration file for the new requirements is available in the repository of configuration files. The program 103 may browse through the existing configuration files in the repository and decides to generate a new script or to load the same configuration.

Figure 5:
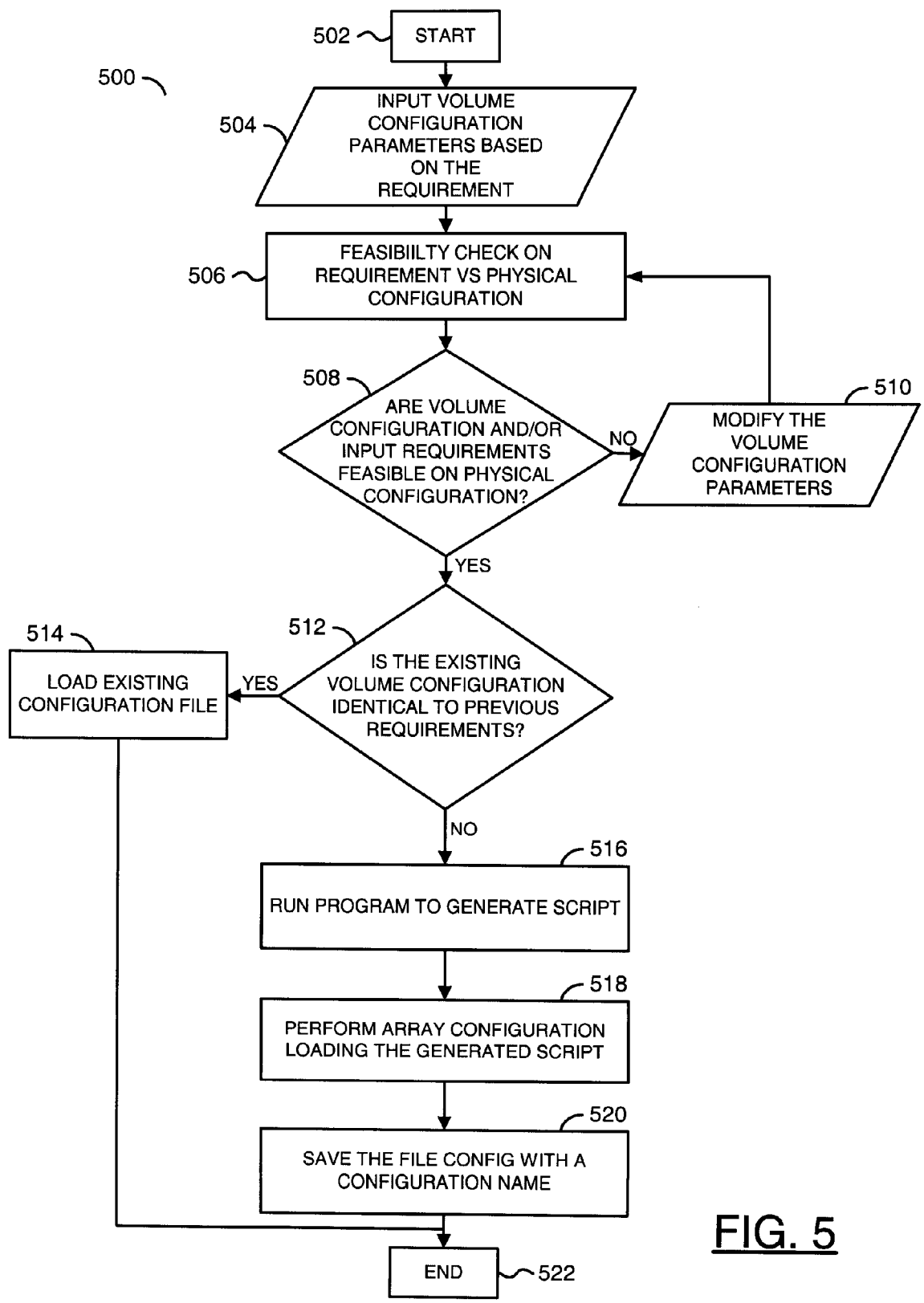
FIG. 5 is a flow diagram illustrating a second scenario of the program execution.

Referring to FIG. 5, an example of a method (or process) 500 illustrating such a scenario is shown. The process 500 generally comprises a step (or state) 502, a step (or state) 504, a step (or state) 506, a decision step (or state) 508, a step (or state) 510, a decision step (or state) 512, a step (or state) 514, a step (or state) 516, a step (or state) 518, a step (or state) 520 and a step (or state) 522. The state 502 generally starts the process 500. The state 504 receives input volume configuration parameters based on the particular requirements. The state 506 may check the feasibility of the requirements compared with the physical configuration. The state 508 determines if the volume configuration and/or input requirements match the availability of the physical configuration. If not, the process 500 moves to the state 510 which modifies the volume configuration parameters and returns to the state 506. If the decision state 508 determines the volume configuration and/or input requirements match the availability on the physical configuration, the process 500 moves to the state 512. The state 512 determines if there is an existing volume configuration file in the repository that is identical to the input requirements. If so, the process 500 moves to the state 514, which loads an existing configuration file and moves to the end state 522. If not, the state 516 runs the program to generate a script. Next, the state 518 performs an array configuration by loading the generated script. Next, the state 520 saves the file CONFIG with a particular configuration name.

An input parameter file INPUT may contain a number of array parameters of the drive array 106. Such parameters may include the number of drives (e.g., 120*a*-120*n*, 122*a*-122*n*, 124*a*-124*n*, etc.), drive trays, capacity of volumes, number of volumes, host mappings, snapshots, volume copy pairs, remote volume mirroring relationships etc. The file INPUT may become the basis of the complete configuration.

The program 103 may be implemented as a number of modules. One module may parse the input file and validate the syntax correctness. Another module may validate the input parameters with a physical feasibility using a file (e.g., SYMBOL.jar) and a file (e.g., SYMBOLutil.jar) to be incorporated. The file SYMBOL.jar and the file SYMBOLutil.jar may be used to read the available drives, drive-trays and/or storage capacity information prior to the configuration parameters being validated for feasibility.

One or more drive parameters (e.g., tray:slot) may be validated for availability in the drive array 106. If a particular storage device is not available, then the parameter may need to be modified to conform to the available resources. The available free-capacity is validated for volume creation using the volume capacity and number of volumes parameters. If there is a shortage of free capacity, then either the drives 120*a*-120*n*, 122*a*-122*n* or 124*a*-124*n* have to be replaced with high capacity drives or additional drives may need to be added, along with modification of drive (tray:slot) parameters to be sent back for re-validation.

The number of drive enclosures (or trays) available in the drive array 106 may be validated for sufficiency to meet with the tray loss protection criteria. If the criterion is not met, then Drive Enclosures are required to be added onto the array, before it is sent back for drive addition and re-validation reflecting the modified drive parameters.

The system 100 may provide one or more premium feature(s) that may be validated to confirm startup of each feature before configuration is started. If a particular feature is not enabled, then one or more feature keys may be used for enabling. The various modules of the program 103 may include (i) a module to generate script with a set of symbol commands meeting the requirement in the input file, (ii) a module to send the symbol commands to the drive array 106 over the network via SYMBOLS.jar and SYMBOLUtil.jar, (iii) a module to validate/verify the setup after configuration with the input parameters, and/or (iv) a module to save the configuration with a particular name (e.g., CONFIG).

The system 100 may provide (i) platform independent execution, (ii) independent of Host Software, (iii) cycle time reduction, (iv) setup configuration from a remote location, (v) a system free from manual errors, (vi) physical Configuration validation with respect to the requirements in no time, and/or (vii) verification of configuration after set up. In one example, a handheld device (e.g., a Blackberry, Palm, etc.) may also be used to implement support for the system 100. A portable device may increase the mobility and ease of use of the system 100 and may make the configuration more flexible.

The present invention may be used by SAN Administrators to design and implement an Enterprise storage infrastructure in an organization without errors and doing it right at the first time. The present invention may be applied to any management software of DAS, NAS, SAN, and any type of network and may be particularly useful where customers need to duplicate (e.g., mirror and/or backup) large setups.

The function performed by the flow diagrams of FIGS. 3-5 may be implemented using a conventional general purpose digital computer program according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAS, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for configuring a storage array, comprising the steps of:
    (A) generating an input file containing a plurality of volume configuration parameters using a computer connected to a network;
    (B) validating said volume configuration parameters by determining whether said volume configuration parameters are feasible to implement in said storage array;
    (C) if said volume configuration parameters are not feasible, changing said volume configuration parameters;
    (D) generating a script file in response to said validated input file, wherein said script file contains a plurality of symbol commands to configure said storage array;
    (E) sending said script file to said storage array over said network;
    (F) configuring said storage array in response to said symbol commands; and
    (G) verifying said configuration of said storage array.

2. The method according to claim 1, wherein said configuration of said storage array comprises a volume configuration.

3. The method according to claim 2, wherein said configuration of said storage array further comprises a mapping configuration.

4. The method according to claim 3, wherein said configuration of said storage array further comprises an attribute configuration.

5. The method according to claim 1, further comprising the step of:
    saving the script file with a particular name.

6. The method according to claim 1, wherein said script file is used to mirror said configuration.

7. The method according to claim 1, wherein said script file is used to backup said configuration.

8. The method according to claim 1, wherein said storage array comprises a network storage array and a controller to implement said script file.

9. The method according to claim 8, wherein said network storage array comprises a plurality of drives.

10. The method according to claim 8, wherein said network storage array comprises a plurality of non-volatile storage devices.

11. The method according to claim 1, wherein said method is platform independent.

12. The method according to claim 1, wherein said method is independent of host software.

13. The method according to claim 1, wherein said method reduces a cycle time needed to configure said storage array.

14. The method according to claim 1, wherein said configuration of said storage array is set up from a location physically remote from said storage array.

15. The method according to claim 1, wherein said configuration of said storage array is verified after set up.

16. The method according to claim 1, wherein said script file is saved for future use.

17. The method according to claim 1, further comprises:
    if said volume configuration parameters are identical to previous volume configuration parameters, loading an existing script file; and
    if said volume configuration parameters are not identical to previous volume configuration parameters, repeating steps (B)-(G).

18. A apparatus comprising:
    means for generating an input file containing a plurality of volume configuration parameters using a computer connected to a network;
    means for validating said volume configuration parameters by determining whether said volume configuration parameters are feasible to implement in said apparatus;
    means for if said volume configuration parameters are not feasible, changing said volume configuration parameters;
    means for generating a script file in response to said validated input file, wherein said script file contains a plurality of symbol commands to configure said apparatus;
    means for sending said script file to a network storage array over said network;
    means for configuring said storage array in response to said symbol commands; and
    means for verifying said configuration of said apparatus.

* * * * *